United States Patent [19]

MacCracken et al.

[11] E Re. 29,438

[45] Reissued Oct. 11, 1977

[54] APPARATUS FOR CREATING AND MAINTAINING AN ICE SLAB

[75] Inventors: Calvin D. MacCracken, Englewood, N.J.; Helmut J. Schmidt, Greenlawn, N.Y.

[73] Assignee: Calmac Manufacturing Corporation, Englewood, N.J.

[21] Appl. No.: 670,550

[22] Filed: Mar. 25, 1976

Related U.S. Patent Documents

Reissue of:

[64] Patent No.: 3,893,507
Issued: July 8, 1975
Appl. No.: 387,148
Filed: Aug. 9, 1973

U.S. Applications:

[62] Division of Ser. No. 204,112, Dec. 2, 1971, Pat. No. 3,751,935.

[51] Int. Cl.[2] ..... F28F 7/00; A63C 19/10

[52] U.S. Cl. ..... 165/46; 62/235; 165/75

[58] Field of Search ..... 62/235, 260, 209; 165/46, 175, 180; 272/56.5 SS, 3; 273/1 B; 61/36 A

[56] References Cited

U.S. PATENT DOCUMENTS

| | | | |
|---|---|---|---|
| 196,653 | 10/1877 | Gamgee | 62/235 |
| 2,769,315 | 11/1956 | Meadows | 62/235 |
| 3,295,594 | 1/1967 | Hopper | 165/46 |
| 3,379,031 | 4/1968 | Lewis, Jr. | 62/235 |
| 3,379,203 | 10/1968 | Donald | 264/209 |
| 3,430,688 | 3/1969 | Crocker | 165/46 |

*Primary Examiner*—William E. Wayner
*Attorney, Agent, or Firm*—Parmelee, Johnson & Bollinger

[57] ABSTRACT

Apparatus for creating and maintaining an ice slab for skating purposes, or an ice chute for a toboggan slide, or for maintaining a layer of snow for skiing. The apparatus includes pluralities of small diameter flexible plastic tubes arranged in grids in portable mats with the tubes placed close to one another and arranged with each input or supply tube portion closely adjacent to an outlet or return tube portion providing an advantageous uniform temperature effect at a small distance above the tubes. A low temperature anti-freeze liquid is pumped through the tubes to provide the desired uniform cooling effect, and the portable mats each include a pair of sub-headers which can conveniently be coupled together with main headers to form a large grid the size of an ice skating rink, or a ski slope. For a rink these small flexible tubes may thereafter be covered with a thin layer of sand, or other protective material, and water is then introduced into the rink and is frozen by the low temperature refrigerant passing through the various tubes. By virtue of the small diameter of the tubes, ethylene glycol or other similar low temperature anti-freeze liquid (which would be very expensive with conventional systems) can economically be used to practice the invention disclosed herein. In the case of a ski slope, the small flexible tubes are covered with a thin layer of sand or dirt, and the circulation of the low temperature refrigerant serves to maintain, i.e. to "hold," a skiable layer of snow (either natural or man-made snow or a mixture of them) on the ski slope during thawing periods when the snow normally would melt away.

7 Claims, 18 Drawing Figures

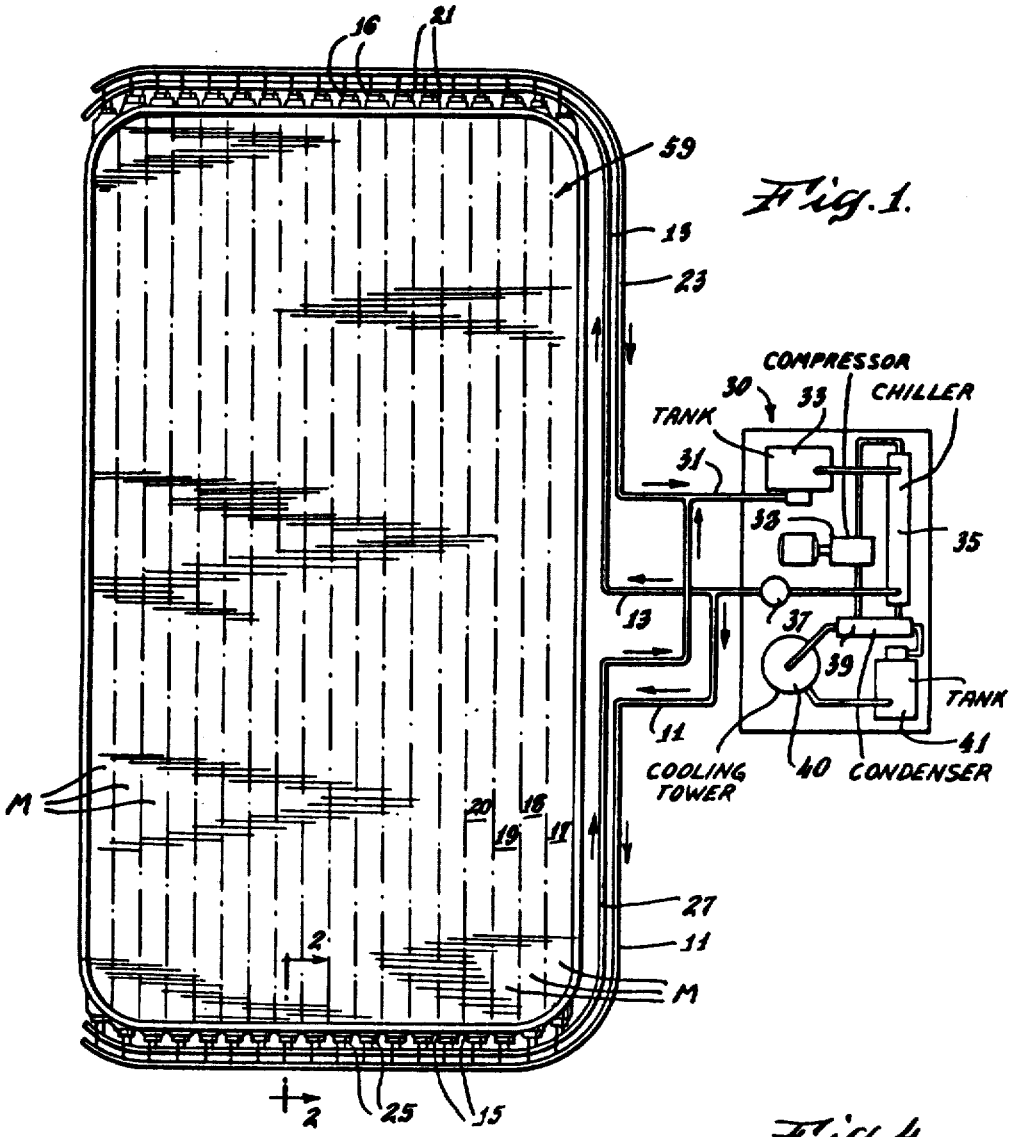
Fig. 1.
Fig. 4.
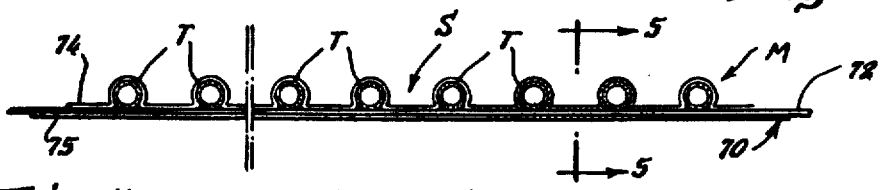
Fig. 5.
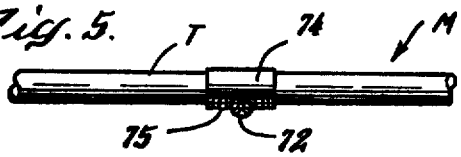

Fig. 2.
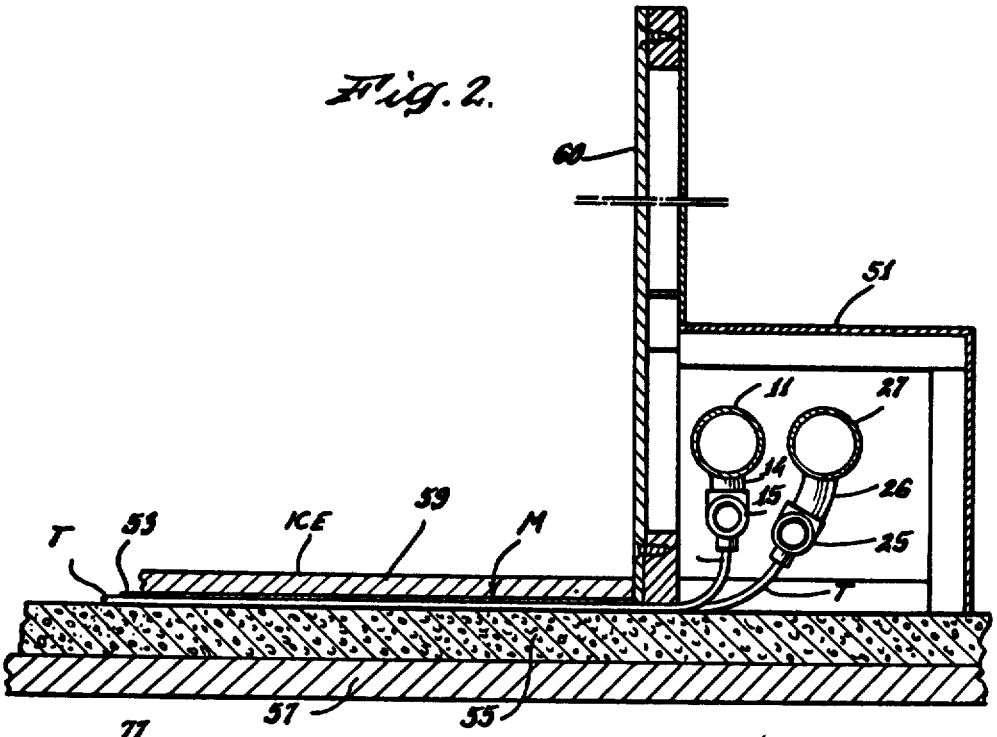
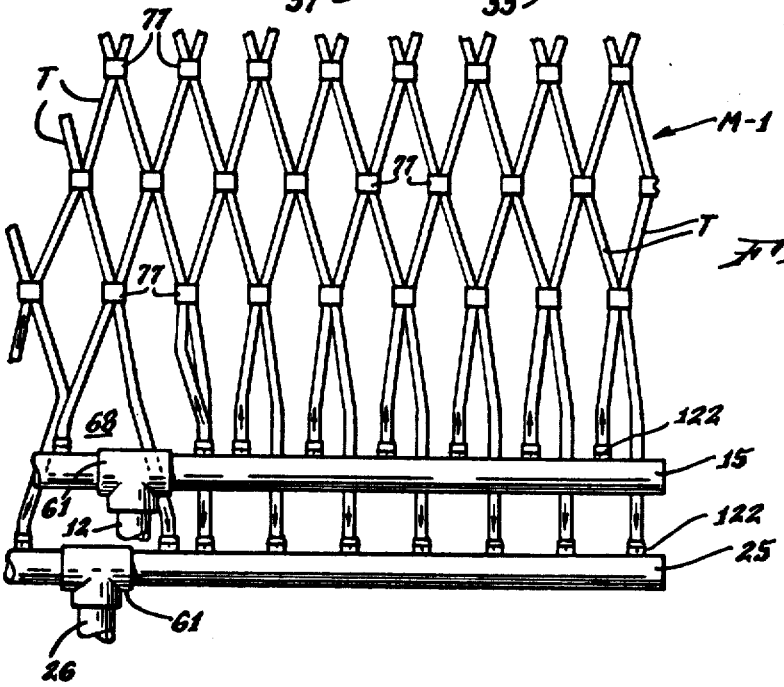
Fig. 6.

20
61
21
61
120
122
16
69
122
M
S
70
T
T
S
70
51
52
S
70
68
122
15
61
12
120
122
25
61
26

Fig. 12.
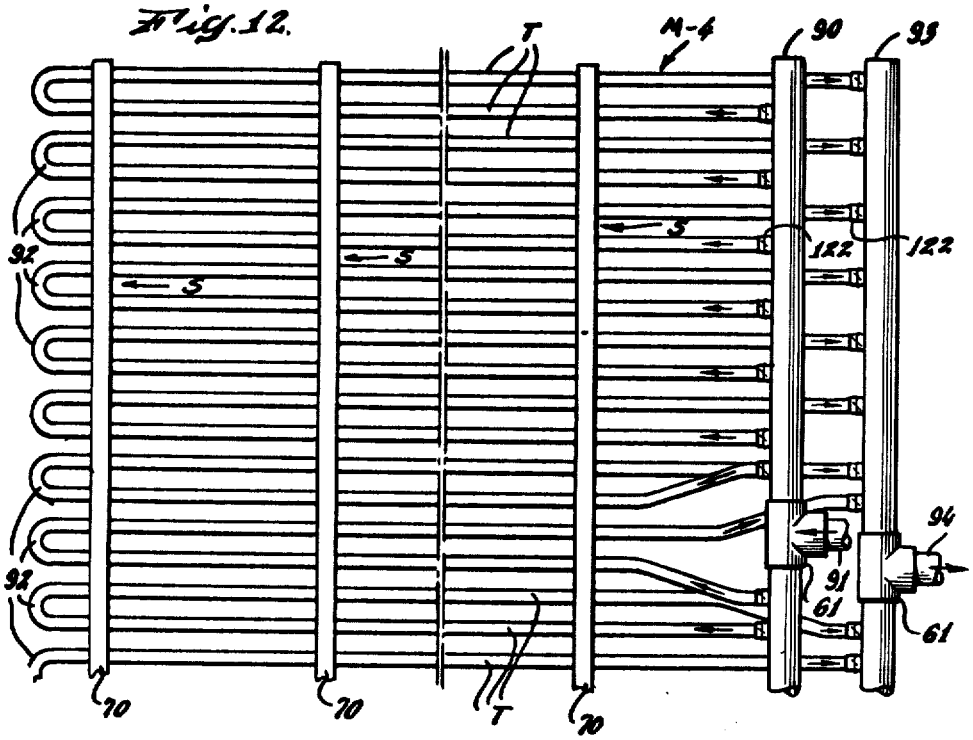
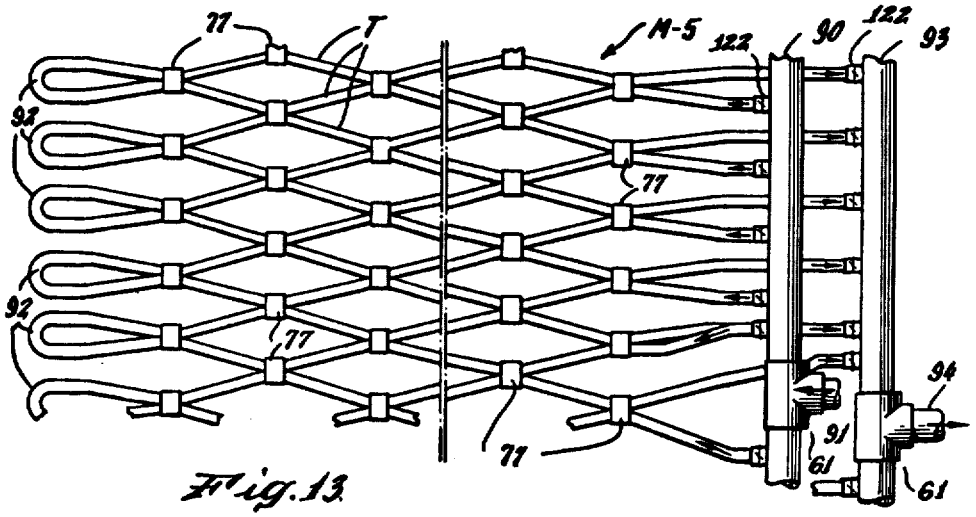
Fig. 13.

Fig. 14.
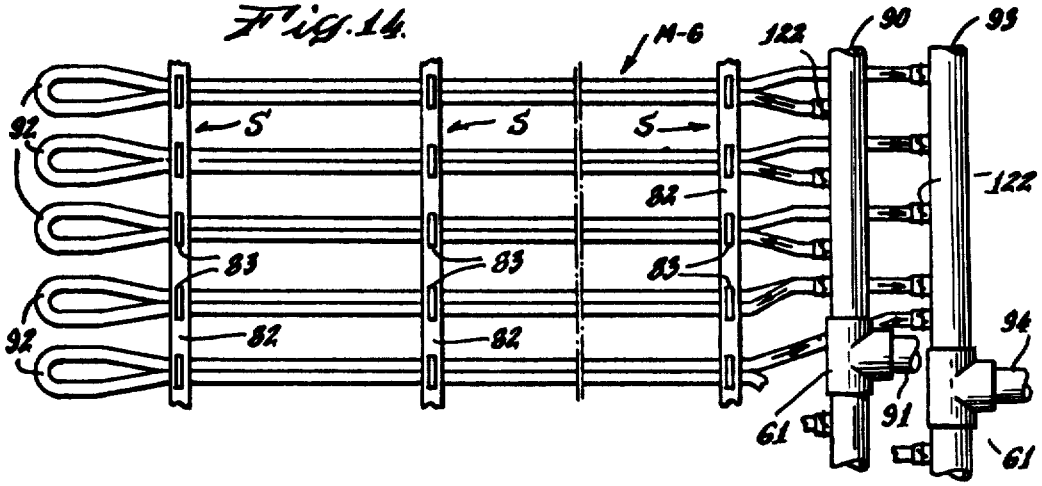
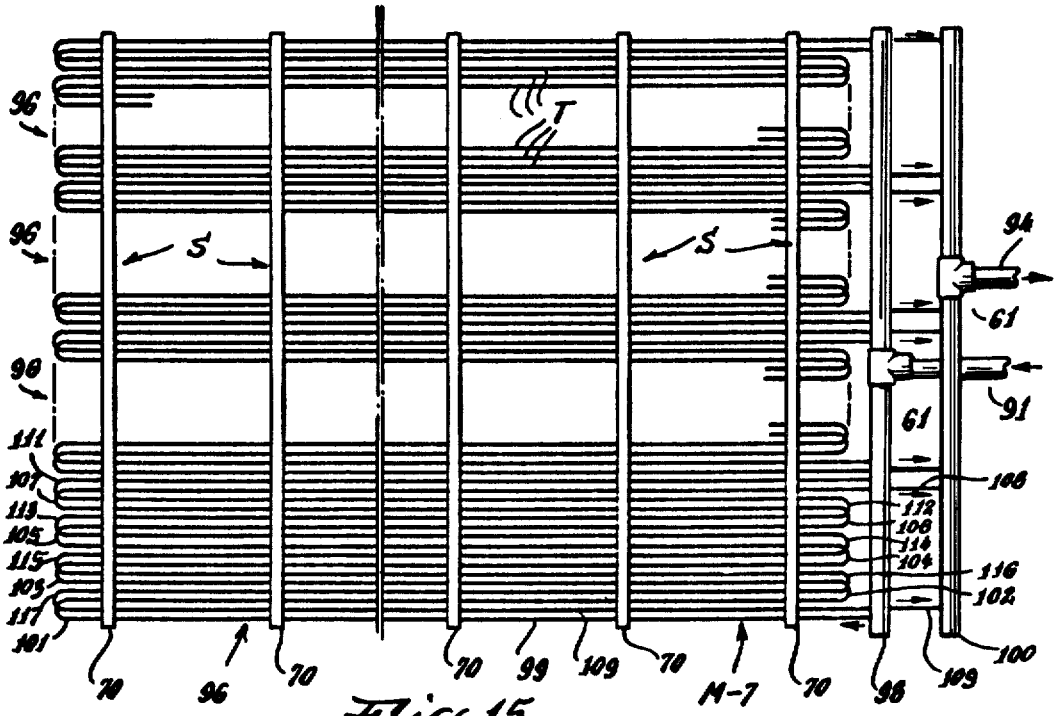
Fig. 15.

APPARATUS FOR CREATING AND MAINTAINING AN ICE SLAB

Matter enclosed in heavy brackets [ ] appears in the original patent but forms no part of this reissue specification; matter printed in italics indicates the additions made by reissue.

This application is a division of prior copending application Ser. No. 204,112, filed Dec. 2, 1971, which issued as U.S. Pat. No. 3,751,935 on Aug. 14, 1974.

The present invention relates to an apparatus for creating and maintaining an ice slab for skating purposes or for maintaining a layer of snow for skiing and in particular relates to a novel economic apparatus for providing portable system formed by multiple interconnected mats of small diameter flexible plastic tubes arranged in grids with the tubes placed close to one another and arranged with each input or supply tube portion closely adjacent to an outlet or return tube portion providing uniform temperature effect at a small distance above the tubes. The portable mats each include an individual supply sub-header and return sub-header for connection to main supply and return headers and the small plastic tubes are adapted to have a low temperature refrigerant pumped therethrough to provide the desired cooling effect.

In the prior art, ice skating rinks have commonly been frozen by the use of large diameter metal pipes having an internal diameter (I.D.) of approximately 1.25 inches, a wall thickness of one-eighth of an inch spaced 4.0 to 4.5 inches center-to-center spacing which have usually been embedded in concrete to provide a floor upon which the water was placed and thereafter frozen. These large diameter pipes in the prior art were filled with calcium chloride ($CaCl_2$) brine as the cooling medium, and such a system involved a brine volume of about 3,200 gallons in the piping under the rink plus additional brine in the tanks and piping of the brine cooling equipment. In the prior art systems, the brine was passed through the refrigeration system to bring its temperature down to approximately 15° to 18° F at the supply point entering the floor of the rink, and the return brine temperature was approximately 17° to 20° F leaving the rink floor, depending upon the ambient temperature and the number of skaters. The ASHRAE Guide and Data Book on "Applications" (1968 Edition) published by the American Society of Heating, Refrigerating and Air-Conditioning Engineers, in Chapter 51, on Skating Rinks at page 616, states that the brine pump should be of sufficient capacity, so that the temperature difference between incoming and outgoing brine does not exceed 2° F under design conditions.

For many years, the prior art has assumed that the above type of under the floor cooling ice skating rink system is the "final word." And the book mentioned above confirms that such a system has been long considered by those skilled in the art to be the "final word." Nevertheless, such a conventional prior art system was very expensive in that the pipes must be assembled together piece-by-piece and welded, or otherwise laboriously and accurately connected and installed at the rink site by trained personnel. Thereafter, the assembled piping was usually embedded in concrete. With this prior art system, the ice rink was permanent and could not be moved from place to place. Additionally, large volumes of brine (about 3,200 gallons in the rink floor plus additional brine in the cooling system) had to be refrigerated and pumped through the pipe network in the floor to freeze the ice. A further problem which was encountered when a prior art system needed servicing was that the rusted metal pipes had to be laboriously chipped out from the concrete floor to be replaced. In addition, a large amount of pumping power was continuously consumed in a prior art system in circulating the large volume of brine at a sufficient velocity to hold a temperature difference between the supply point at entrance to the pipe network in the floor and the return point at exit from the floor at no more than about 2° F.

The present invention is a radical departure from the prior art, an important technological pump which represents a real breakthrough in the ice skating rink field. Instead of 2° F differential in the supply and return temperatures, a differential from 15° up to 25° F or more can be employed. Instead of heavy walled metal pipes having an I.D. of 1.25 inches and an O.D. of 1.50 inches, thin-walled, flexible, small diameter plastic tubing is used having an I.D. of between one-eighth and three-eighths of an inch, such tubing having a wall thickness of about one-thirty-second of an inch. Instead of using 3,200 gallons of brine in the rink floor, only 300 gallons of low temperature anti-freeze liquid, such as ethylene glycol, is used and operating at a supply temperature of no more than 10° and preferably no more than 5° F, instead of 15° to 18° F, as required in the conventional prior art. Moreover, instead of utilizing a high level of pumping power to circulate brine, only one-third or less pump power is utilized, which represents a great saving in electricity extending into the future; typically $6,000 to $7,000 per year savings or more in a full size rink application. Instead of using large diameter headers to supply and return the brine, the present invention enables the use of headers which are only about one-tenth of the cross-sectional area of the prior art headers.

The present invention advantageously enables the use of small diameter flexible plastic tubing which can be pre-assembled into portable mats in a factory and thereafter conveniently rolled up and carried to a site to be quickly coupled together with other mats to form the cooling grid for an ice rink. Manufacturing these plastic tubing mats in a factory each with a supply and return sub-header adapted to be easily coupled together with the main supply and return header enables the initial cost of a system embodying this invention to be drastically lower than that of the prior art. Advantageously, once these plastic tubing mats are formed at the factory, they can be rolled up so as to form a conveniently portable roll, similar to a roll of carpeting, and which can be taken by pick-up truck or station wagon from the factory to the rink site to be unrolled and laid down like strips of carpet. This, therefore, means that the present invention gives to the user practicable and economic portability.

Further, by virtue of the fact that the plastic tubing has been pre-assembled in mats, servicing is much easier to perform and far less costly because one mat can be quickly and conveniently removed and exchanged for another. Additionally, the present system enables much smaller header piping and related equipment to be employed because of the smaller volume of liquid involved, thus representing a further savings because all of the valves and fittings are only about one-tenth as large as in the prior art.

The plastic tubing mats which can be employed in practice of the present invention are many times greater in length than they are in width. For example, in a flexible plastic tubing mat adapted to extend the length of a full-size skating rink, the mat is generally 200 feet in length and four feet wide. In the case where the flexible plastic tubing mat is to extend transversely of such a rink, the mat is generally 85 feet long and 4 feet wide. The circulation in the tubing is arranged to double back on itself such that both the supply and return sub-headers are at the same end of the 85 foot mat for all of the tubing therein.

For mats extending the length of the rink, the small diameter, flexible plastic tubes are arranged to run the length of the mat in closely spaced parallel relationship with the ends of the tubes being connected to supply and return sub-headers at opposite ends of the mat. The direction of liquid flow is in opposite directions in closely spaced adjacent tubes to provide uniform cooling action in the ice in spite of the temperature differentials of 15° to 25°, so keeping the temperature of the ice as uniform as is possible across its face. Fastening means in transverse relation to the axis of the small plastic tubes are arranged so as to form the plastic tubing into a grid-like form. Supply sub-headers each having a length approximately equal to the width of the mat are arranged so as to supply each tube with cold anti-freeze liquid and similar return sub-headers are arranged so as to receive the refrigerant after it has passed through the tubes. Thereafter, the fluid is transferred from the return sub-header into cooling apparatus to be again refrigerated and, thereafter, recirculated through the system.

These flexible plastic tubing mats embodying the present invention can be constructed and assembled in the factory where mass production techniques can be used. In the presently preferred embodiments, these mats are formed from plastic tubes of ethylene vinyl acetate (EVA). Fastening means running transverse to the direction of the axis of the tubing forms the tubing into a grid-like form. After assembly with their sub-headers, the tubing mats can be rolled into an easily portable form and transported to the location wherein the skating rink is to be assembled. The ice rink is formed on a level and approximately rectangular area of ground with a layer of insulating material preferably separating the flexible tubing mat from the ground. Several of these mats, each of which comprises a plurality of plastic tubes arranged in grid-like form, are arranged on the rectangular area that will form the ice rink. The sub-headers of the individual mats, thereafter, are interconnected with appropriate headers and freezing equipment so as to complete the ice freezing system. The tubing mats are usually covered with a thin layer of sand or other similar material, so as to prevent a skater's blade from penetrating the ice surface and thereby cutting, tearing, or otherwise damaging the plastic tubing. When these preparations are complete, water is sprayed onto this surface and allowed to freeze. Because of the low temperature of the anti-freeze liquid passed through the tubes, the ice is quickly frozen and the ice rink formed.

The various advantages, features and objects of the present invention will become more fully understood from a consideration of the following [descriptin] *description* of certain preferred embodiments of the invention in conjunction with the accompanying drawings, in which corresponding reference numbers are used to indicate parts performing corresponding functions in the various embodiments:

FIG. 1 is an overall plan view of a full size ice skating rink having the freezing system of the present invention in which a plurality of flexible tubing mats containing small diameter flexible plastic tubing extend lengthwise of the rink area and are interconnected in a grid covering the whole area of the rink and containing a low temperature liquid;

FIG. 2 is an elevational cross-sectional view taken across the line 2—2 in FIG. 1 and shown on enlarged scale to disclose in detail the main header and sub-header assembly and the interconnection of the flexible plastic tubing therewith;

Figure 3:
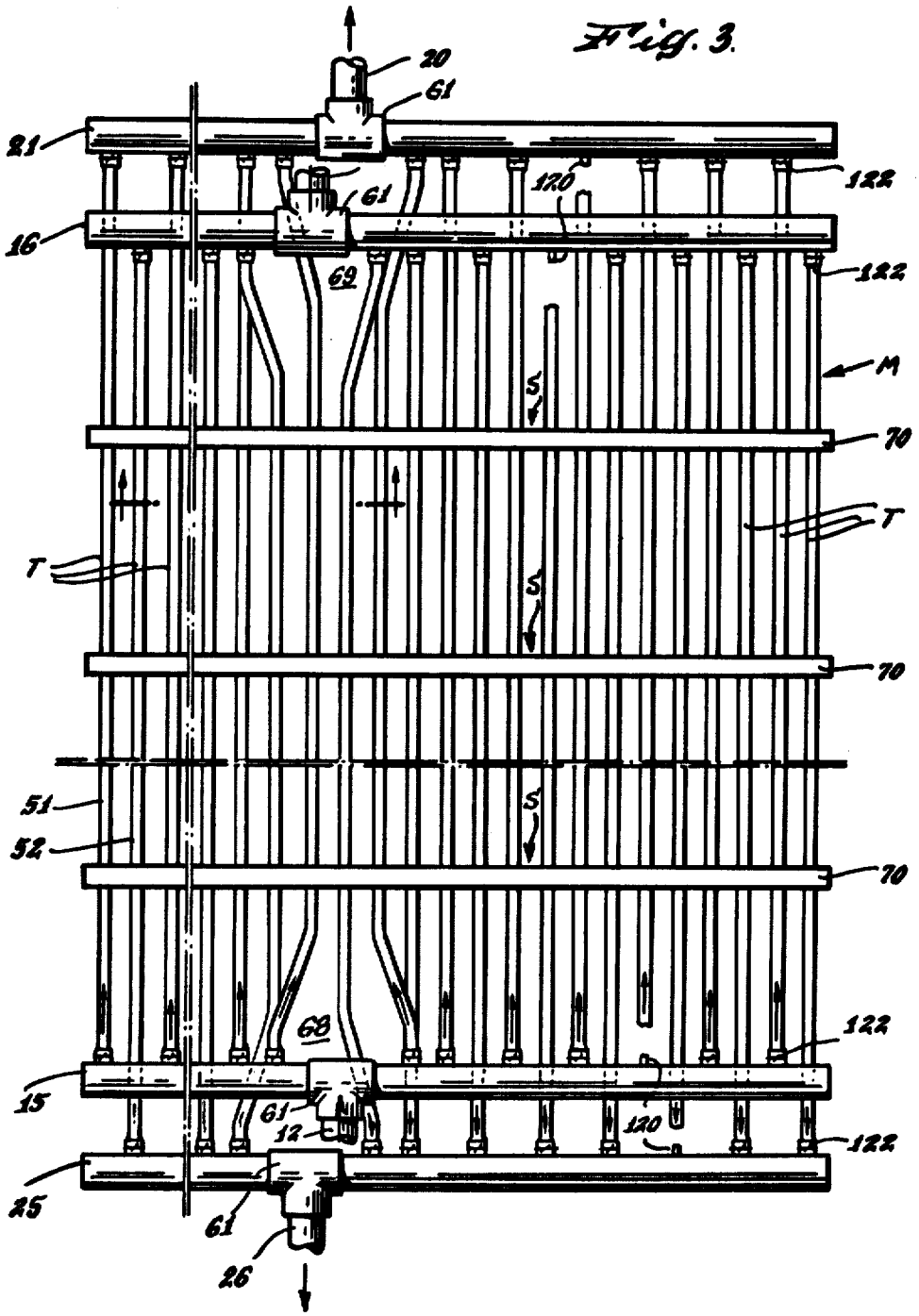
FIG. 3 is an enlarged plan view of one of the flexible tubing mats of the system shown in FIG. 1. This particular flexible tubing mat as shown in FIG. 3 is adapted to be laid lengthwise of the rink area shown in FIG. 1.
Figure 7:
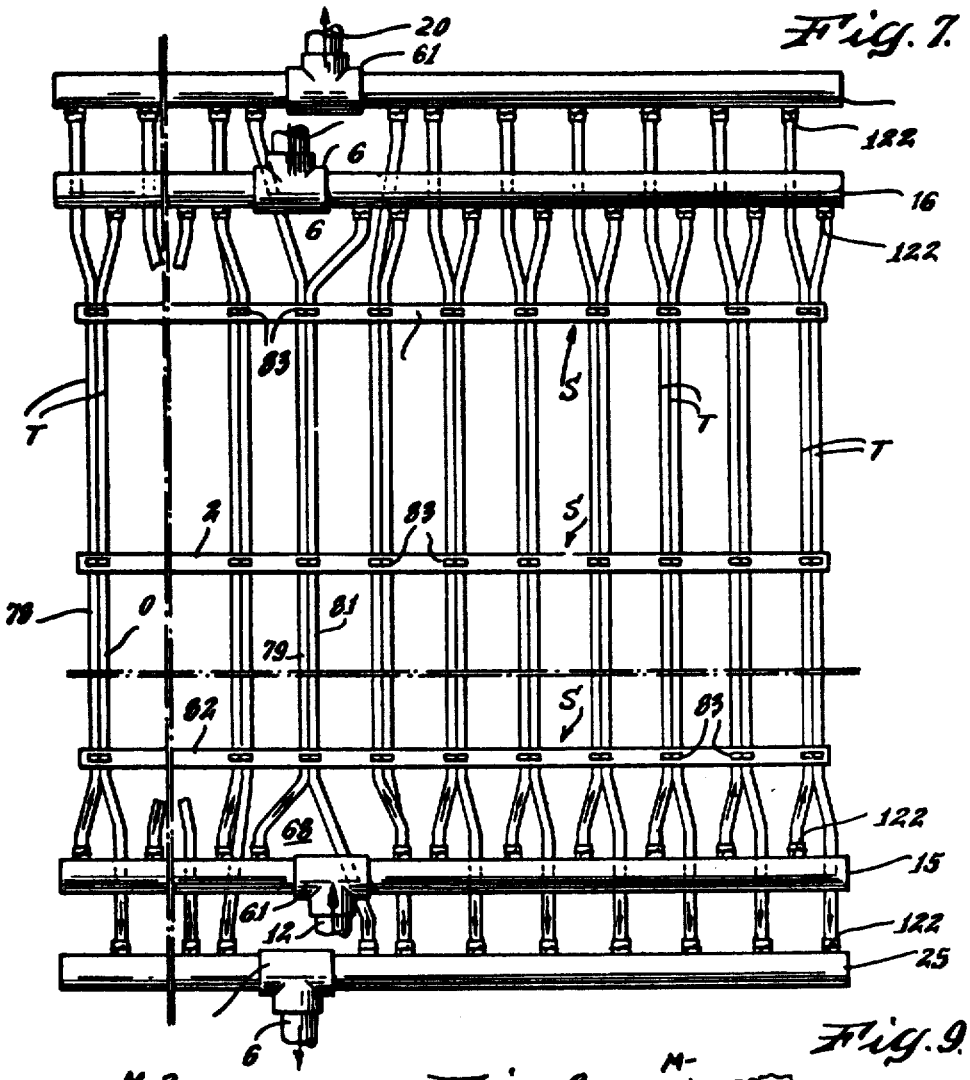
Figure 8:
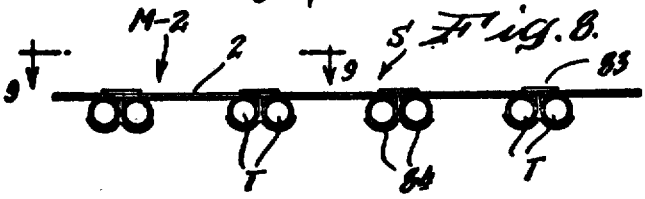
Figure 9:
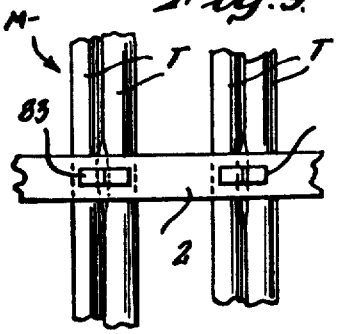
Figure 10:
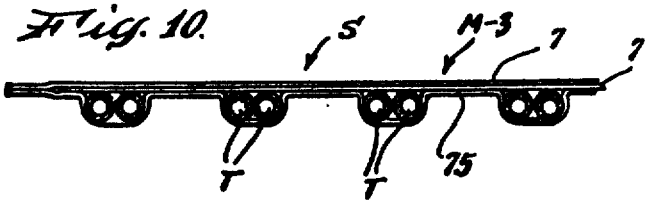
Figure 11:
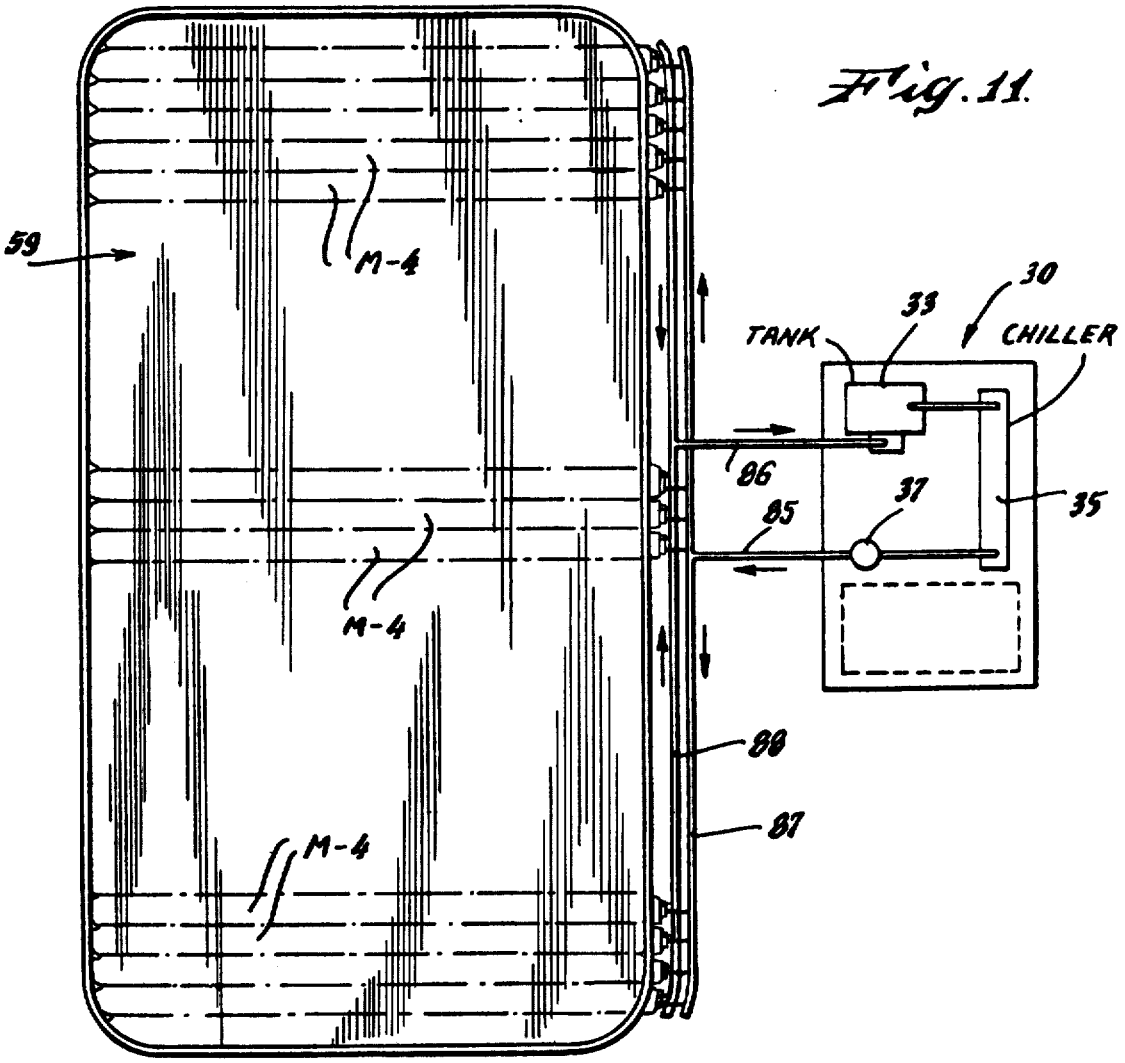
Figure 16:
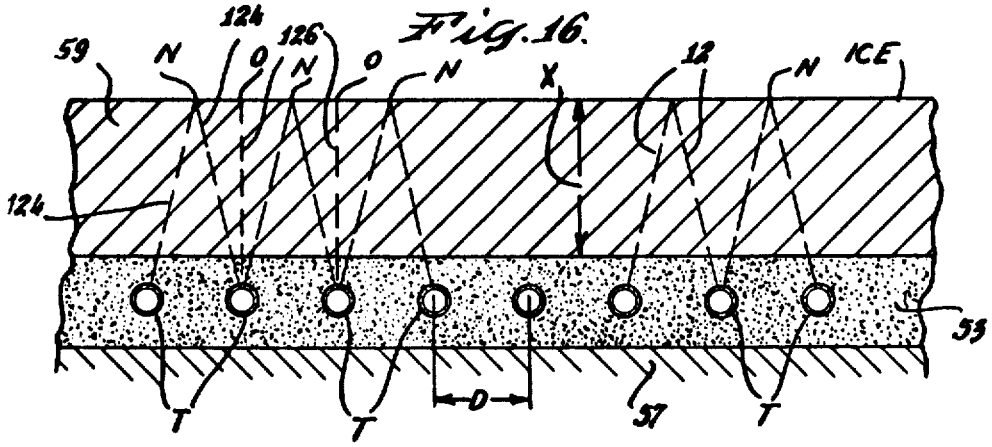
Figure 17:
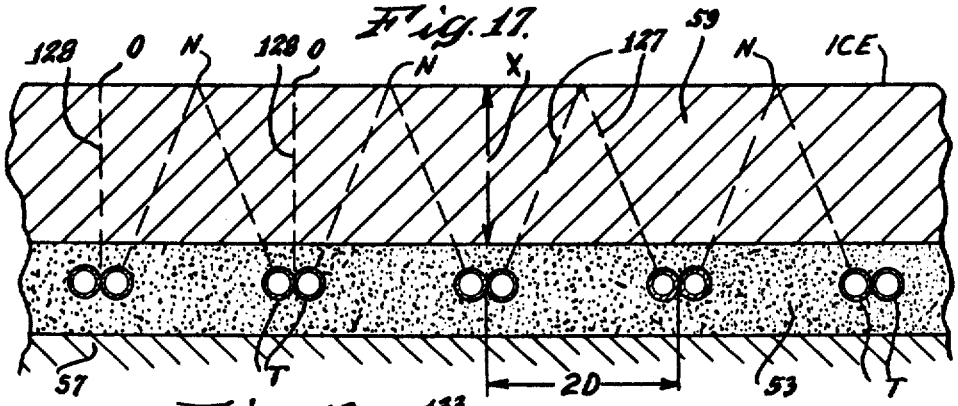
Figure 18:
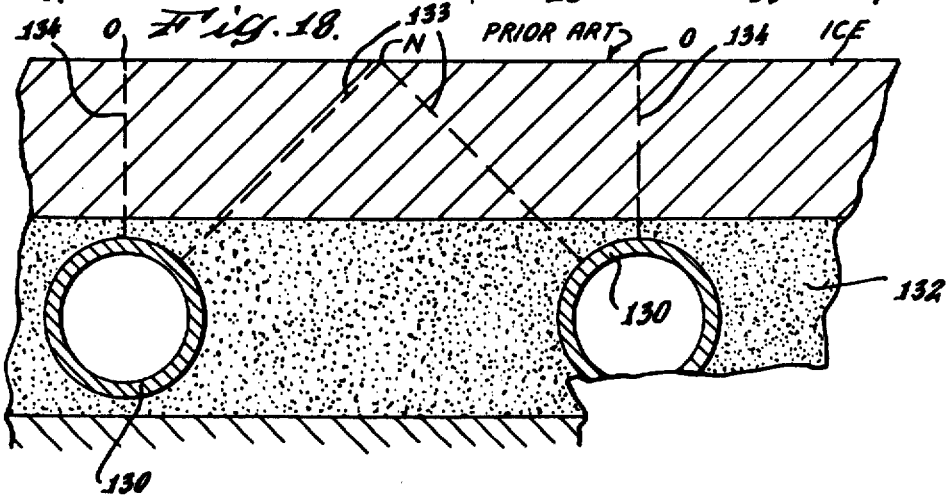

FIGS. 4 and 5 show in detail means for securing the plastic tubing in closely spaced parallel relationship to one another to hold the same in a grid-like assembly. FIG. 4 is an enlarged partial sectional view taken across the line 4—4 in FIG. 3, and FIG. 5 is a partial sectional view taken along 5—5 in FIG. 4;

FIG. 6 is a plan view on the same scale as FIG. 3 showing a portion of a flexible tubing mat wherein an alternate type of securing means is employed to hold the tubing of the mat in a grid-like assembly;

FIG. 7 is a plan view similar to FIG. 3 in which the flexible tubing mat has four sub-headers and wherein pairs of the small diameter plastic tubes are adjacent to one another with the low temperature liquid therein flowing in opposite direction;

FIGS. 8, 9, and 10 are cross-sectional and plan views showing means for securing the pairs of tubes adjacent to one another and for holding them in a grid assembly as is shown in FIG. 7. FIG. 8 is a partial sectional view taken along the line 8—8 in FIG. 7; FIG. 9 is a partial plan view as seen from the line 9—9 in FIG. 9; and FIG. 10 is a sectional view similar to FIG. 8 and showing alternative securing means;

FIG. 11 is an overall plan view of a full size skating rink having the ice making system of the present invention, wherein a plurality of flexible tubing mats run the width of the rink and are interconnected in a grid covering the whole area of the rink. Only two main headers are employed in the system of FIG. 11, both extending along the same side of the rink. The small diameter flexible tubes are bent back in U-bends at the left in FIG. 12 and are connected to a pair of sub-headers at the right;

FIGS. 12, 13, 14, and 15 are detailed plan views of embodiments of flexible tubing mats generally similar to FIG. 11 incorporating the use of two sub-headers as is shown in FIG. 11 and using different configurations of the plastic tubing and of the tubing securing means to achieve the uniform cooling effect in the ice above the mat;

FIGS. 16 and 17 are cross-sectional views shown in full size of the present invention disclosing the advantages over the prior art of the use of small diameter closely spaced plastic tubes; and FIG. 18 is a cross-sectional view of a conventional prior art making system using large diameter pipes embedded in concrete.

Referring now to the drawings in greater detail, FIG. 1 illustrates a typical installation of the freezing system of the present invention. Ethylene glycol or other similar low temperature anti-freeze liquid such as methyl alcohol (or ethylene glycol or methyl alcohol somewhat diluted with water) which has been cooled to a temperature of no more than 10° F and preferably of about 5° F or lower is pumped through headers 11 and 13 into individual supply sub-headers at opposite ends of the ice slab. The individual supply sub-headers 15 are arranged to service each of the individual flexible tubing mats M. Such mats M, as shown, are approximately 200 feet long and 4 feet wide to extend longitudinally beneath the ice rink. Typically, there are approximately twenty-one such mats laid down side by side like long strips of carpeting to cover the entire area beneath the skating surface of a full size skating rink. The low temperature anti-freeze liquid, as stated above, flows from the main supply header 11 into the supply sub-header 15 of the flexible tubing mat M indicated at 17. Additionally, such coolant flows through the main supply header 13 into supply sub-header 16 on the opposite end of the mat 17.

As is shown in the drawing of FIG. 3, the coolant from the sub-header 15 flows through the individual small diameter flexible plastic tubes T towards a return sub-header 21 wherein it is collected to be fed into a main return header 23 (FIG. 1) to be returned to the refrigeration station 30. Simultaneously, coolant from sub-header 16 flows downward through individual tubes T to a return sub-header 25, wherein it is collected and then returned by a main header 27 to the refrigeration station 30. The temperature of the anti-freeze liquid in the main return headers 23 and 27 is approximately 25° F during typical operating conditions. By having the low temperature coolant run through the closely spaced tubes T of the mat M in opposite directions through successive tubes, close temperature averaging in cooling effect is obtained, i.e., the coldest liquid near the inlet end in each tube T is near the least cold liquid near the outlet end of the neighboring tubes T, and liquid at intermediate temperatures in each tube T is near the liquid at intermediate temperatures in the neighboring tubes T. The result is to obtain substantially uniform temperature along the surface of the ice.

The ice flow in the other flexing tubing mats, 18, 19, 20, and in the others shown in FIG. 1, operates in substantially the same way.

At the cooling station 30 shown in FIG. 1, the main return header 23 joins the other main header 27 to form a single outlet connection pipe 31 whose output is collected in a tank 33. From tank 33, the anti-freeze liquid is passed through a chiller 35 to reduce its temperature to no more than 10° F and preferably to approximately 5° F or lower and again is pumped back into the supply headers 11 and 13 by pump means 37 feeding an inlet connection pipe 36 to headers 13 and 11. The chiller 35 is a heat exchanger wherein a primary refrigerant (such as Freon) from a refrigerant circuit is expanded, and it, therefore, absorbs the heat from the anti-freeze coolant liquid as it passes through the chiller 35. The refrigerant circuit for this system includes a compressor 38 which passes the compressed Freon through a condenser 39, and wherein the heat is extracted. Then the cooled compressed Freon passes into the chiller 35, wherein it is expanded as mentioned above. Condenser 39, tank 41, and cooling tower 40 have water circulated therethrough which serves to remove heat energy from the compressed Freon and to discharge the heat energy in the cooling tower.

In FIG. 2 the relationship of the supply and return headers is clearly shown. The main supply header 11 is connected by a short line 12 to each of the supply sub-headers 15 which, in turn, are connected to the individual tubes T in each of the mats M. The coolant, therefore, flows from the supply header 11 into each of the supply sub-headers 15 and into the various tubes T. The coolant passes the length of each tube T and is returned to the cooling station 30, as was discussed above. As was also noted, coolant passes through the supply sub-headers 16 and is removed by return sub-headers 25 to return to the refrigeration station 30. This is shown above in FIG. 2, wherein a tube T, representative of a plurality of tubes in each mat M, is joined with a return sub-header 25 and the coolant is thereafter passed through short connecting lines 26 from sub-headers 25 into the main header 27 to return to the station 30.

FIG. 2 discloses in detail the method of constructing an ice rink by utilizing the present invention. The flexible tubing mats M are laid upon a suitably prepared surface. The base 55 upon which the mats are laid is of a suitable material such as a layer of sand which had been placed over a layer of insulation material 57, such as a layer of foamed polyurethane. Once the mats M have been positioned on the surface 55, the sub-headers on each mat are connected by the short coupling lines 12 and 26 to the main supply and return headers, as described. A layer of sand or other suitable protective material 53 may be applied so as to cover the tubes T. This sand layer 53 protects the tubes T in that should the ice 59 be penetrated by a skater's blade, it will not cut, tear or otherwise injure the tubing. As shown in the drawing, dasherboard 60 serves as a splash board to protect the header assemblies from damage which are conveniently protected beneath a seat bench 51 attached to the dasherboard 60. Thereafter, fresh water is sprayed upon the sand 53 and the coolant is pumped through the network of tubes T below the water to freeze it so as to form the ice slab 59.

FIG. 3 shows in greater detail the sub-header assemblies and tubing T of a mat M such as is used in the system of FIG. 1. In this embodiment in which the flexible tubing mats extend, the length of a rink, the mat is approximately 4 feet wide and approximately 200 feet long, and each of the sub-headers 15, 16, 21 and 25 are about 4 feet long. The short connection lines 12, 14, 20 and 26 are connected to the [mid-poits] *midpoints* of the respective sub-headers 15, 16, 21 and 25 through T-shaped couplings 61. Connections 12 and 26 extend to the main headers 11 and 27, as shown in FIG. 2, and connections 14 and 26 extend to the main headers 13 and 23, respectively.

While as is shown in FIG. 3, most of the tubes T throughout the whole area of the flexible tubing mat M are closely spaced and parallel to one another, a few of the tubes in the coupling regions 68 and 69 are displaced a small distance from their centerline at the ends thereof to make room for the respective couplings 61 at the midpoints of the sub-headers. A preferred spacing is about three-quarters of an inch center-to-center average for tubing having an I.D. of about three-sixteenths of an inch.

As is shown in FIGS. 3, 4 and 5, the various tubes T are kept closely spaced and parallel to one another by securing means S including the spacer strip assembly 70 which are arranged transverse to the axis of the tubing T. FIGS. 4 and 5 show in more detail the construction of the securing means S. The securing means S includes a stiffener wire 72 which runs perpendicular to the longitudinal axis of the parallel tubes. The stiffener wire 72 and the individual tubes T are held in place by means of spacer tape assembly 70 which, of course, must be unaffected by water. The spacer strip assembly 70 comprises an upper woven glass fiber fabric tape 74, which is arranged so as to bend up and over to surround and embrace the tubing and a lower woven glass fiber fabric tape 75, which is beneath and encases the stiffener wire 72. When the upper and lower tapes 74 and 75 are placed together with the wire 72 they form a grid-securing structure as is shown in FIG. 4. The exact arrangement of the upper and lower tape with respect to the tubing is best seen in FIG. 4 and the centerline relationship of the stiffener wire with respect to the tape assembly is best seen in FIG. 5. The upper and lower tapes may be secured to each other by waterproof adhesive or by stitching.

The flexible tubing mats M provided by the present invention can be readily pre-fabricated in a factory, rolled into a roll and transported to the construction site where they are interconnected to form the grid system. This is in marked contrast to the large diameter piping of the prior art which was laboriously assembled on the job. The method of construction is such that the small diameter flexible tubes are extended along the length of the mat and closely spaced from one another. Thereafter, the tubes are cut to the desired length and connected to the appropriate sub-headers. As shown in FIG. 3, the first tube 51 at the left is connected with supply sub-header 15 and return sub-header 21; the second tube, tube 52 is alternately connected with supply sub-header 16 and return sub-header 25. The successive tubes shown in FIG. 3 are connected in a similar fashion so that the direction of the coolant in each tube is opposite to the direction of the coolant in each immediately neighboring tube. Thereafter, the spacer strip assemblies 70, running transverse to the axis of the tubes and at predetermined intervals are installed, so as to secure the tubing into a grid-like network. When completed, the sub-headers and their tubes can be conveniently rolled into a roll and transported to the construction site.

In FIG. 6 is shown an alternative flexible tubing mat embodiment M-1 to the structure shown in FIG. 3. In FIG. 6 the tubes T are slightly bent away and toward one another so as to form an elongated X grid web of the tubes, as shown in FIG. 6. The arrangement of the tubes T with respect to the sub-headers is essentially the same as has been described in connection with FIG. 3, and therefore only the sub-headers 15 and 25 at one end of the mat M-1 are shown. Clips 77 of non-corrosive metal or plastic are placed at regular intervals along the lengths of the tubes T surrounding two adjacent portions of the tubes to hold them to one another to form the elongated X grid structure shown in FIG. 6. The coolant flows in opposite directions through the successive tubes T.

FIG. 7 shows a further alternative flexible tubing mat embodiment M-2 to those which have been discussed above. As noted below, anti-freeze liquid from the supply sub-headers 15 and 16 flows through the tubes T and to the appropriate return sub-headers 21 and 25. Because of the configuration of the sub-headers, coolant will flow through tubes 78 and 79, for example, in a direction opposite to that of the fluid in the respective adjacent tubes 80 and 81. Correspondingly throughout the mat M-2 coolant in each of the immediately adjacent pairs of tubes flows in opposite directions. As discussed above, this flow pattern produces an advantageous temperature averaging effect at a small distance above the mat.

It will be noted that at the beginning of its travel, the liquid within tube 79 has been freshly refrigerated and is commencing to flow through the mat while near the same point, the fluid in tube 80 has already passed through most of the mat and is at its least cold temperature. Likewise, where the liquid commences passing through the tube 80, it is immediately adjacent to the portion of tube 79 in which the liquid has traversed most of the mat and is also in its least cold condition.

Also, it can be noted in FIG. 7 that tubes in the regions 68 and 69 have been bent slightly off of their center lines to allow room for the couplings 61 that are centrally located in the sub-headers 15, 16, 21 and 25, respectively. Further, spacer strip means S are used in the mat M-2. These spacer strips are placed equidistant apart, at predetermined intervals along the length of the mat M-2. The spacer strips S not only hold the tubes T to one another in pairs, but they also serve to hold the entire formation together and to keep it in a grid-like form after [is] *it* has been rolled and transported to a construction site.

FIGS. 8, 9 and 10 more completely illustrate the configuration of the spacer strip assemblies. In FIG. 8, it can be seen that the spacer strips include a woven glass-fiber fabric tape 82 and a plurality of brass notebook-type fasteners 83 have been used to penetrate the spacer strip. The two legs 84 of each fastener have been inserted between the pair of tubes T and wrapped up around them, so as to hold the tubing in place and to one another to form pairs. A top view of the securing means S is shown in FIG. 9 wherein it is possible to see the tape 82 which has been penetrated by the brass fasteners and which is holding the pair of tubes T in place. The heads of the brass fasteners 83 are visible in FIG. 9.

FIG. 10 shows an alternative mat embodiment M-3 in which different securing means S are used for holding the tubes in an arrangement similar to that shown in FIG. 8. In FIG. 10, the upper tape 74 and lower tape 75 embrace the pairs of tubes T which have been placed adjacent to one another. To further strengthen the grid structure, a stiffener wire 72 has been encased between the tapes extending transverse to the tubes. This wire 72 serves to give transverse stiffness to the grid-like construction of the mat M-3, to hold the pairs of tubes spaced apart, as shown while allowing the mat to be rolled up lengthwise without hindrance from the stiff wires.

It will be understood that any of the alternative flexible tubing mat embodiments M-1, M-2 or M-3 can be used in the system of FIGS. 1 and 2 in lieu of the mats M, as shown.

FIG. 11 shows a system including a transverse grid configuration different from those which have been discussed above. In FIG. 11, while the ice rink is essentially of the same dimensions, the flexible tubing mats M-4 instead of running the length of the rink, run transversely across the shorter width of the rink. This particular construction makes it possible for the coolant to transverse the width of the rink twice, — once across and once back —, and thereby enables the use of only two headers, — a supply and return header, instead of the four header arrangement which has been discussed previously. Moreover, each transverse mat has only two sub-headers.

FIG. 11 shows a refrigeration station 30 which is similar to that which was described in connection with FIG. 1. It comprises a means for cooling the low temperature coolant down to a temperature of 5° F or lower.

As shown in FIG. 11, the ice freezing system includes a pipe 85 which supplies the coolant from the refrigeration section 30 to the ice rink and a return pipe 86 which removes the coolant after it has passed through the system and returns it to the section 30 for recycling. As can be noted therein, pipe 85 is connected with a main supply header 87 and supplies fluid to the various supply sub-headers in the mats M-4; and the outlet pipe 86 is connected to a main return header 88.

FIGS. 12, 13, 14 and 15 more clearly describe the particular constructions of the transversely arranged mats which can be utilized in the system that is shown in FIG. 11. In FIG. 12, supply sub-header 90 is coupled to the main supply header 87 through coupling 61 and connecting line 91. The liquid enters into the sub-header 90, passes into tubes T, and because of the "U" bend 92 at the center of each tube, the coolant flows (in the tubes) across the full width of the ice rink and returns, as shown by the arrows. This flow path thereby enables the system to have liquid flowing, in neighboring tube portions, in opposite directions so as to provide uniformity of effective cooling in the ice as discussed above. The return sub-header 93 is connected through the coupling 61 and short connecting line 94 with the main return header 88.

The tube securing means S shown in FIG. 12 for the tubes T in the mat M-4 is the same as the securing means S with the tape assembly 70, shown in FIGS. 3, 4 and 5. We have found that the mats can be handled conveniently and easily when the securing means S includes tapes of glass-fiber fabric approximately one-half inch wide and spaced from 6 to 18 inches apart along the length of the mat.

FIG. 13 shows an alternative embodiment of a transverse M-5. This mat M-5 is similar in grid configuration to the mat M-1 which was discussed with respect to FIG. 6, but the mat M-5 also employs the same principles as shown in FIG. 12, wherein a "U" bend 92 at the center of each tube T enables the fluid to pass once across the ice and then return before it is received by the return sub-header 93 to flow back to the cooling station.

As is noted with respect to FIG. 6, clips 77 have been attached at various intervals along the length of the tubing so as to join adjacent tubes into forming an elongated X pattern or quilt-like grid.

In FIG. 14 an alternative embodiment of a transverse mat M-6 is shown similar to the mat M-2 which was disclosed in FIG. 7. This mat M-6 can be utilized with respect to the system shown in FIG. 11.

Both the first and second halves of each tube T are held closely adjacent to one another by securing means S shown as spacer strips 82 with fasteners 83 similar to those which were described with respect to FIGS. 8 and 9. The legs of the fasteners 83 are wrapped around the tubes so as to hold the tubing in place with respect to the other tubes and to keep the two adjacent halves of each tube held closely against one another.

FIG. 15 shows a mat embodiment M-7 having a coolant flow configuration which is particularly adapted for use beneath very short expanses of ice. Each of the tubes T shown in FIG. 15 cross beneath the width of the ice, return, recross beneath the width of the ice, return and recross and return again for several times thereafter. The uniform cooling effect is enhanced by the fact that the tubes are arranged so that each pair of tubes is arranged as a set 96. The two tubes in each set of tubes overlaps and alternates with the other tube in the set of tubes, and the coolant is flowing in opposite directions in the two tubes in each set. Running the flow in the tubes in opposite directions accomplishes, again, balancing of the cooling effect, as uniformly as possible, across the surface of the ice.

The details of this mat configuration M-7 are shown in FIG. 15 wherein the coolant is supplied through a short line 91 and a coupling 61 and through a sub-header 98. On its first pass through the tubes 99 at the bottom of FIG. 15, coolant traverses the mat M-7 to point 101 where because of a "U" bend, it is re-routed across the mat on its pass in a direction opposite to the first and returns to point 102 where it is again, because of a "U" bend, re-routed across the ice on its third pass to point 103, and from this point 103 it is again re-routed across the ice for a fourth pass to the point 104. It is re-routed across the ice as is shown in FIG. 15 for an additional four times by going to "U" bend 105, to "U" bend 106, to "U" bend 107 to point 108 and is thereafter connected to return sub-header 100. On each pass, the coolant in this tube 99 is moving in a direction opposite that of the coolant in a tube 109 immediately neighboring thereto and interlaced with the tube 99. This tube 109 also has seven "U" bends 111–117 which are positioned adjacent to and overlapping with the respective seven "U" bends 107–101 of the tube 99. Thus, the two tubes 99 and 109 comprises one of the tubing sets 96.

It is to be understood that any of the embodiments of the flexible tubing mats M-4, M-5, or M-6 can be employed in the system shown in FIG. 11 in which the mats extend transversely across the full size rink. In this case, the mats M-4, M-5, or M-6 are about 85 feet long and 4 feet wide. The sub-headers 90 and 93 are about 4 feet long.

The flexible tubing mat M-7 is adapted for use with smaller ice rinks as indicated above.

The dimensions of a flexible tubing, as shown in FIG. 1 or FIG. 11 are such that the main headers 11, 13, 23, 27 or 87 or 88 have an inside diameter of approximately 2 inches, the sub-headers in the mats M, M-1, M-2, M-3, M-4, M-5, M-6, and M-7 which supply and return the coolant directly to and from the tubing T in the mats themselves have an inside diameter of approximately three quarters of an inch. A convenient way to make these sub-headers 15, 16, 21, 25 and 90 and 93 is to use copper pipes 4 feet long having holes punched therein and then short copper spuds having an outside diameter (O.D.) slightly larger than the inside diameter (I.D.) of the tubes T are soldered into the holes in the pipe or otherwise fastened to the main body of the sub-header to serve as a connection spud between the sub-header and the end of each plastic tube T. These coupling spuds, for example, as shown in FIG. 3 at 120, are typically one-quarter inch in outside diameter. The plastic tubing of the mat has an average inside diameter of three-sixteenths of an inch. When installed, the ends of the tubing is expanded from its normal three-sixteenth inch inside diameter to one-quarter inch to fit onto the coupling spuds on the sub-header. Thereafter, the tubing is clamped upon the spuds by a small commercially available spring clamp 122 (sometimes called a "hose clamp") which encircles the end portion of the tubing T surrounding the spud 120.

In practicing the present invention, the flexible plastic tubes T have an inside diameter between one-eighth and three-eighths of an inch. It is to be understood that tubing having an oval shaped passage can be used. Thus, the term "inside diameter" or "I.D." is to be interpreted broadly enough to include such oval tubing having an average inside dimension of between one-eighth and three-eighths of an inch.

It is not necessary that the protective layer 53 of sand or other protective material be used, providing that the operator of the rink is careful to maintain an unbroken slab of ice over the otherwise bare tubing T.

For the best results, it has been found that ethylene vinyl acetate is the preferred material from which the tubes T for the flexible mats are made. It has been noted that ethylene vinyl acetate (EVA) is inert to low temperature anti-freeze liquids such as ethylene glycol or methyl alcohol and has good temperature characteristics, and its elasticity remains at low temperature (down to approximately 5° F to zero [0] degree F). Moreover, this elasticity enables the tubes to be stretched over the spuds 120. Further, we have found that EVA is preferable to polyethylene because EVA has better temperature characteristics, i.e., it is not brittle and that it has a higher degree of stretchability than does polyethylene. Thus, advantageously, the stretchability of the tubing accommodates the expansion and contraction due to temperature changes. For example, the tubing mats may be laid down in the fall when the temperature is approximately 60° F, and then the tubing is cooled to 5° F or below by the coolant.

Generally, it has been found that the optimum results from the invention are obtained when the spacing of the tubes is such that the distance between the tubes T is less than the thickness of the ice. This is shown more clearly in FIGS. 16 and 17. In FIG. 16, small diameter flexible tubes T are parallel to one another and equidistant apart. The tubes T may be located within a protective layer of material 53 which is preferably sand. The ice above the tubing is preferably of a thickness, for example, 1.25 inches, such that the thickness (X) of the ice is greater than the center-to-center distance (D) between neighboring tubes T. The same distance (D) exists between all other tubes shown in FIG. 16, which is shown as three-quarters of an inch with the tubes T having an I.D. of three-sixteenths of an inch. By virtue of the close spacing of the tubing T, the temperature differential between a point N at the surface of the ice midway between, e.g. equidistant from, the two neighboring tubes and a point O directly over each tube will be substantially less than that which is experienced in the prior art system. The distance shown by the dashed lines 124 from points N to the respective tubes T is not much greater than the distance 126 from the points O to the respective tubes T.

It is to be noted that the cooling of the surface points N and O is accomplished by withdrawing heat down through the ice along the lines 124 and 126. Since these lines are almost of equal length, the effective cooling action is substantially uniform over the entire surface of the ice.

FIG. 17 shows the effective cooling action when the tubes are in adjacent pairs, as shown in the mats M-2 (FIG. 7) and M-6 (FIG. 14). The pairs of tubes are spaced by an approximate distance 2D, and thus the average spacing per tube is about D. The ice thickness X is preferably greater than D, as discussed above in connection with FIG. 16. Once again, it is seen that the distances 127 from the points N to the respective pairs of tubes is not much greater than the distance 128 from points O. Thus, a substantially uniform cooling action is obtained at the surface of the ice.

A prior art system is shown in FIG. 18 where wide diameter thick-walled metal pipes 130 are embedded in concrete 132. The centers of the pipe 130 have been customarily spaced approximately 4 to 4½ inches apart. A 4 inch center-to-center spacing is shown. At points N midway between these pipes, there will be found an 8° differential between the temperature of the ice surface at that point N, and the temperature of the brine within the pipes. Because of this wide differential in the temperatures, it is possible for soft spots or melting to occur at the ice surface at midpoints N in the prior art system. The distances 133 from the midpoints N at the ice surface to the widely spaced pipes 130 are much greater than the distance 134 from points O directly over the pipes. Thus, a much different effective cooling rate occurs at points N and O.

The system of the present invention utilizes small diameter flexible plastic tubing placed much closer together and low temperature coolant, and thus (a) the points N and O are all at almost the same temperature, and (b) the differential between the temperature at the surface of the ice and the temperature of the concrete at various points is more uniform and the cooling path lengths 124, 126, 127 and 128 are all fairly short, and this, therefore, provides a better quality of ice.

Thus, it has been found that even though the present system has only about one-tenth the volume of a conventional system for a rink of the same size, better cooling and a better quality of ice are provided by having a much greater number of very small diameter tubes very close together with very cold coolant. The inlet and outlet temperature of the coolant is approximately 5° and 25° F, respectively. However, inlet and outlet temperatures of −5° and 25° F can also be used to advantage.

As is noted in FIG. 18, because the temperature of brine being at 15° to 18° F at the inlet and 17° to 20° F at the outlet (an average brine temperature of approximately 17.5° F), it is sometimes possible with the two pipes 130 being separated by a distance of 4 to 4½ inches that the point N half way between these two pipes could be at a temperature greater than that of the melting point of fresh water. Therefore, the regions near N on the ice would be in the form of troughs or valleys of slush, causing a ripple appearance of ridges and valleys in the ice surface. In FIGS. 16 and 17, the average coolant temperature in the tubes T is approximately 15° F and the heat flow paths 126 and 128 are shorter than the heat flow paths 133 (FIG. 18); thus, surface melting is less likely to occur and significant ridges and valleys do not occur in the ice surface.

With respect to this particular layout of FIGS. 16 and 17, it has been noted the dimensions which seem best suited for this application are 1¼ inch for the thickness of the ice, a quarter inch of sand 53 or other material above the tops of the tubing to protect them as has been noted above, and an average center-to-center spacing D of three-quarter inch between tubes. Again, by virtue of the extremely low temperatures at which the systems of this invention operate and the extremely close placement of the tubes, better cooling and better quality ice results.

The prior art systems utilize calcium chloride ($CaCl_2$) brine from the coolant solution on the basis of economics, i.e., it has usually been financially impractical to use any other type of coolant because of the large volumes under the rink floor of such a system (3,200 gallons). The present invention can use a coolant such as an ethylene glycol mixture because of its small capacity under the rink floor (less than one-tenth that of the prior art systems), and it can operate at a much, much lower temperature than the typical prior brine solution system.

The combination of very cold tubing coupled with close spacing of numerous small diameter tubes gives the invention the desired characteristics of better quality ice and better cooling results.

The small diameter plastic tubes have an I.D. in the range from one-eighth to three-eighths of an inch and are spaced closer together than the ice thickness, which should be less than 2 inches. The average center-to-center tube spacing is from ½ to 1½ inches, and is shown as being three-quarter inch in FIG. 16. A large temperature differential of 20° to 30° F is utilized between the inlet and outlet temperatures of the circulating coolant. A flow rate of less than one-fiftieth gallon per minute per square foot of ice surface can be used, as compared with the prior art systems in which usual flows are many times that fraction. The coolant inlet temperature is not more than 10° F and preferably not more than 5° F, or lower. The pairs of tubes T in FIGS. 7, 8, 9, 10, 14 and 17 can be extruded together as a co-extruded pair, if desired. The [loweor] *lower* flows allowed by the great temperature differential of 20° to 30° F allow for smaller size fittings and lower pumping costs. By virtue of the fact that the ice temperature is not nearly as responsive to the temperature of the low temperature coolant in view of the large temperature difference, variations produced in circulation flow rate by changing the circulating pumping pressures of the pumps 37 provide an easy and reliable means of control of the overall ice freezing and maintaining system.

It is to be understood that the various flexible tubing mats M, M-1, M-2, M-3, M-4, M-5, M-6 and M-7 can also be utilized to "hold" snow on a ski slope under conditions when the snow would otherwise begin to melt. On a ski slope the mats are laid transverse to the slope, i.e., are laid with the tubes T extending along horizontal contour lines of the slope. It is more convenient to utilize the types of mats M-4, M-5, M-6 and M-7 as employed in the apparatus of FIG. 11, because this enables main headers to be extended along only one border of the ski slope. The refrigeration station can be located off to one side of the slope near the top, middle or bottom of the slope, whatever may be convenient.

Moreover, the present invention can be employed to advantage in creating and maintaining an ice trough or chute to be used as a toboggan slide or for similar sliding purposes. For example, in such an application, a flexible mat 4 feet wide and 100 feet long having the two headers at only one end, such as the mats M-4, M-5 and M-6, can be employed. For a slide 2 feet wide, the mat is folded in half along its length to make it 100 feet long and 2 feet wide with a double layer of tubing resulting from such folding. The mat can be bent around curves of the toboggan slide and inclined to create banked curves. Typically, the mats are laid end-to-end with the sub-headers near each other so that one mat extends down the slide from the sub-header location and the other extends up the slide from that location. Thus, an icy trough can be created and maintained with curves and straight stretches, as desired.

From the foregoing, it will be understood that the illustrative embodiments of the small diameter flexible plastic tubing mats, as shown above, are well suited to provide the advantages set forth. And since many possible embodiments may be made of various features of the invention and as the apparatus here described may be varied in various parts, all without departing from the scope of the invention, it is to be understood that all matter here and before set forth shown in the accompanying drawings is to be interpreted as illustrative and not in a limiting sense in that certain features of these embodiments may be used without a corresponding use of other features without departing from the scope of the invention.

We claim:

1. A flexible portable plastic tubing mat adapted to be laid side-by-side with other similar mats for creating and maintaining an ice slab for skating and for preventing snow from melting on a ski slope and adapted to be laid end-to-end with other similar mats for creating an ice chute or trough for a toboggan slide or similar sliding purposes, a. said portable mat having a length many times greater than its width with a plurality of small diameter flexible plastic tubing members extending lengthwise of said mat adapted to have cooled anti-freeze liquid pumped therethrough, b. said flexible plastic tubing members having an inside diameter in the range from one-eighth to three-eighths of an inch, c. securing means connected to said tubing members for securing them in a grid pattern in said mat, d. said mat including supply and return sub-headers extending across one end of said mat with the ends of a plurality of said tubing members being connected respectively to said supply and return sub-headers with the direction of flow of the anti-freeze liquid being opposite in neighboring tubing members in the mat, e. said flexible portable mat being rollable into a roll for ease of transportation, and f. said sub-headers being adapted to be connected to main headers in an installation for interconnecting the plurality of said tubing members through the sub-headers to the main headers.

2. A flexible portable plastic tubing mat as claimed in claim 1 in which said small diameter plastic tubing members are co-extruded in pairs of such members and the ends of the tubing members are connected to said supply and return sub-headers to produce an opposite direction of the anti-freeze flow in the respective tubing members of each pair.

3. A flexible portable plastic tubing mat as claimed in claim 1 in which the mat is about 4 feet wide and at least 85 feet long.

4. A flexible portable plastic tubing mat as claimed in claim 1 in which supply and return sub-headers extend across both ends of said mat with the ends of a plurality of the tubing members connected respectively to supply and return sub-headers at opposite ends of the mat.

5. A flexible portable plastic tubing mat as claimed in claim 1 in which said small diameter plastic tubes are composed of ethylene vinyl acetate.

6. A flexible portable plastic tubing mat as claimed in claim 5 in which said securing means include tapes extending transversely along the mat at spaced positions along the length of said mat.

*7. A flexible portable plastic tubing mat adapted to be laid side-by-side or end-to-end with other similar mats for creating and maintaining a frozen area,*

*a. said portable mat having a length many times greater than its width with a plurality of small diameter flexible plastic tubing members extending lengthwise of said mat adapted to have cooled anti-freeze liquid pumped therethrough,*

*b. said flexible plastic tubing members having an inside diameter in the range from one-eighth to three-eighths of an inch,*

*c. securing means connected to said tubing members for securing them in a grid pattern in said mat,*

*d. said mat including supply and return sub-headers extending across one end of said mat with the ends of a plurality of said tubing members being connected respectively to said supply and return sub-headers with the direction of flow of the anti-freeze liquid being opposite in neighboring tubing members in the mat,*

*e. said flexible portable mat being rollable into a roll for ease of transportation, and*

*f. said sub-headers being adapted to be connected to main headers in an installation for interconnecting the plurality of said tubing members through the sub-headers to the main headers.*

* * * * *